Patented June 30, 1953

2,643,954

UNITED STATES PATENT OFFICE 2,643,954

ALKOXYALKYL ESTERS OF BIS (4-CARBOXYPHENYL) SULFONE AND CELLULOSE ESTERS PLASTICIZED THEREWITH

John R. Caldwell, Kingsport, Tenn., assignor to Eastman Kodak Company, Rochester, N. Y., a corporation of New Jersey No Drawing. Application December 21, 1949, Serial No. 134,338

13 Claims. (Cl. 106—179)

This invention relates to alkoxyalkyl esters of bis (4-carboxyphenyl) sulfone and to their employment as plasticizers in cellulose lower alkanoates. All esters referred to in this specification are diesters.

Bis (4-carboxyphenyl) sulfone has the formula:

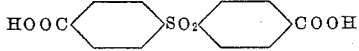

and is a well known compound which can be prepared, for example, from toluene and sulfuric acid, cf. Meyer, Ann. 433 336 (1923). Alkyl esters of this dicarboxylic sulfone are also known, e. g. Meyer describes the methyl and ethyl esters thereof. In U. S. 2,427,640 patented September 16, 1947, the unsaturated alkyl esters are disclosed and said to be useful as plasticizers. The saturated alkyl esters are also employable as plasticizers.

I have now found that the alkoxyalkyl esters of bis (4-carboxyphenyl) sulfone are also useful as plasticizers and that furthermore, they possess the characteristic of improved compatibility with cellulose esters. Moreover, the cellulose esters into which these diesters are incorporated possess improved surface hardness and plasticizer retention qualities. They can be employed in plasticizing many synthetic resins including such resins as the vinyl types of resins. The alkoxyalkyl esters are compatible, in general, with cellulose acetates, propionates, acetate-propionates, acetate-butyrates, and other cellulose derivatives. In contrast to this, the alkyl esters are generally not compatible with the cellulose acetates, propionates, acetate-propionates and acetate-butyrates. The alkoxyalkyl esters impart a greater surface hardness to many synthetic resins and are especially valuable for increasing the surface hardness of the cellulose esters. Thus, in compounding a particular composition having a given flow temperature, the resulting plastics products containing the alkoxyalkyl esters as plasticizers possess a greater surface hardness than the same resins containing conventional plasticizers such as di-2-ethylhexyladipate, etc. In other words, the alkoxyalkyl esters plasticize cellulose esters so that they can be readily molded but with the result that the plastics products so produced are considerably harder than could be obtained with conventional plasticizers. This difference can be illustrated by the following tabulated hardness data for a cellulose acetate-butyrate plastic which has been plasticized with various equal amounts by weight of both the ethoxyethyl ester of bis (4-carboxyphenyl) sulfone and a standard plasticizer, viz. di-2-ethylhexyladipate. The hardness of the plasticized resins is given in terms of Rockwell units (15 X scale).

| Plasticizer (percent) | Hardness Employing— | | Difference in Hardness |
|---|---|---|---|
| | Sulfone Ester | Adipate Ester | |
| 5 | 84 | 74 | 10 |
| 10 | 79 | 64 | 15 |
| 20 | 73 | 31 | 42 |

It can thus be seen that the employment of the ethoxyethyl ester of bis (4-carboxyphenyl) sulfone yields plastics of markedly improved hardness as compared to the employment of a standard plasticizer such as that illustrated, and that the difference in hardness increases markedly as the proportion of plasticizer is increased. Either of the exemplary plasticized plastics whose data are tabulated, can be molded at about the same temperature, but the one containing the sulfone ester is much more resistant to marring, scratching or deformation at room temperature.

Regarding a method for their preparation, I have found that these new alkoxyalkyl esters of bis (4-carboxyphenyl) sulfone can be produced by esterifying bis (4-carboxyphenyl) sulfone with a monoalkyl ether of an alkylene glycol having the formula:

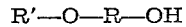

wherein R represents an alkylene radical containing from 2 to 4 carbon atoms and R' represents an alkyl radical containing from 1 to 6 carbon atoms, in the presence of an esterification catalyst. Other methods can also be employed.

It is an object of my invention to provide alkoxyalkyldiesters of bis (4-carboxyphenyl) sulfone and a method for their preparation. It is also an object of my invention to provide new and useful plasticizers for synthetic resins which are of improved compatibility and result in increased hardness in the plastic compositions made therewith. Other objects will appear hereinafter.

In accordance with my invention I prepare alkoxyalkyl esters of bis (4-carboxyphenyl) sulfone which have the general formula:

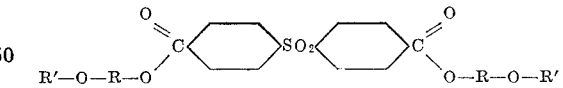

wherein R represents an alkylene radical containing from 2 to 4 carbon atoms and R' represents an alkyl radical containing from 1 to 6 carbon atoms, by reacting, in the presence of an esterification catalyst, bis (4-carboxyphenyl) sulfone with an alkylene glycol monoalkyl ether having the general formula:

$$R'-O-R-OH$$

wherein R and R' have been defined above.

Esterifying agents which can be employed include sulfuric acid, p-toluenesulfonic acid, and various other compounds which are known to catalyze esterification reactions, e. g. hydrochloric acid, ethylsulfuric acid, ethylsulfonic acid, benzenesulfonic acid, trichloracetic acid, zinc chloride, etc. Generally speaking, I advantageously employ either p-toluenesulfonic acid or sulfuric acid since they are readily available, quite effective, and produce no undesirable side reactions; however, it is quite apparent that most of the commonly known esterification catalysts could also be used.

The monoalkyl ethers of alkylene glycols which I can employ are defined by the general formula set forth above and include ethylene glycol monobutyl ether, ethylene glycol monomethyl ether, ethylene glycol monoethyl ether, propylene glycol monoethyl ether, butylene glycol monoethyl ether, ethylene glycol monohexyl ether, etc. Quite advantageously, I employ the ethylene glycol monoalkyl ethers in most instances. Most advantageously, I employ ethylene glycol monoethyl ether.

The esterification reaction can generally be conducted under a reflux condition which allows the water formed to distill off. Periods of time of several hours duration are required to obtain good yields, e. g. 5–20 hours; however, longer or shorter periods of time can be employed. The yields are usually in the vicinity of 65–80%.

The ethylene glycol monoalkyl ethers are advantageously employed in considerable excess in order to obtain good yields. The theoretical amount required is 2 mols per mol of the bis (4-carboxyphenyl) sulfone; however, it is advantageous to employ a considerable excess of the ether over that theoretically required. From 4 to 10 mols can be employed advantageously per mol of the sulfone; however, lower or higher proportions can also be employed.

The resulting esters can be readily separated from the reaction mixture by distilling off the excess alkylene glycol monoalkyl ether under a vacuum and then washing the residue with a dilute aqueous alkaline solution, e. g. potassium hydroxide, sodium hydroxide, various alkaline salts such as sodium carbonate, etc., to neutralize the esterification catalyst. The ester can then be purified by recrystallization from ethyl alcohol or other inert solvent, e. g. dioxane, methyl alcohol, etc.

The alkoxyalkyl esters can also be produced by other methods, thus, the bis (4-carboxyphenyl) sulfone can be heated with a molecular excess of $PCl_5$ to form the acid chloride. Upon further heating the HCl and $POCl_3$ which forms and the excess $PCl_5$ can be driven off and the remainder comprising the crude acid chloride of bis (4-carboxyphenyl) sulfone can then be converted to the ester by dissolving it in an excess of an alkylene glycol monoalkyl ether and heating the mixture in a vacuum to remove the HCl which forms and the excess alkylene glycol monoalkyl ether. The resulting alkoxyalkyl ester of bis (4-carboxyphenyl) sulfone can then be separated and purified as described previously.

Examples of alkoxyalkyl esters which can be prepared according to these processes include, as examples, the methoxyethyl ester of bis (4-carboxyphenyl) sulfone, the ethoxyethyl ester, the butoxyethyl ester, the ethoxypropyl ester, the methoxyhexyl ester, the propoxybutyl ester, etc.

The alkoxyalkyl esters can be advantageously employed as plasticizers for the lower aliphatic saturated monoacid (acyl) esters of cellulose, e. g. cellulose acetate, cellulose propionate, cellulose acetate-propionate, cellulose acetate-butyrate, cellulose propionate-butyrate, etc. These esters can also be employed as plasticizers for other cellulose derivatives such as cellulose nitrate, various cellulose ethers, e. g. ethyl cellulose, benzyl cellulose, etc. The alkoxyalkyl esters can furthermore be employed to plasticize vinyl resins and various copolymers thereof. Vinyl resins are meant to include those polymers prepared from compounds containing the $CH_2=C-$ group, the $-CH=CH-$ group, the $-CH=C<$ group, the $CH_2=C<$ group, and the $>C=C<$ group. Exemplary compounds include acrylic acid esters, e. g. methyl acrylate, methacrylic acid esters, e. g. ethyl methacrylate, acrylonitrile, vinyl esters, e. g. vinyl acetate, vinyl alcohol (hydrolyzed vinyl acetate), vinyl halides, e. g. vinyl chloride, vinylidene halides, e. g. vinylidene chloride, styrene, isopropenyl esters, trifluorovinyl acetate, tetrafluoroethylene, 1,1-difluoro-2,2-dichloroethylene, ethylene and other derivatives thereof, etc.

The alkoxyalkyl esters of bis (4-carboxyphenyl) sulfone can be incorporated into these resins in any manner known in the prior art. They can be employed in combination with other plasticizers, e. g. diethyl phthalate, triphenyl phosphate, dibutyl adipate, di-2-ethylhexyladipate, etc. Generally, it is advantageous to employ the alkoxyalkyl esters in the amount of from about 15 to about 60% by weight of the resinous material into which they are being incorporated. Of course, higher or lower percentages can be used. Usual methods which can be employed for incorporating these plasticizers into synthetic resins include intermixing the plasticizer and resin on mixing rolls, churns, etc. The plasticizers can also be advantageously incorporated into a dope or solution of the resin to be plasticized with the solvent being removed subsequently to form a sheet, film, or coating, etc. which is tough, clear and hard-surfaced. The solvents which can be employed are innumerable. Examples of solvents which can be advantageously employed include alkyl alcohols, e. g. methyl alcohol, ethyl alcohol, etc., various ketones, e. g. acetone, etc. and numerous other industrial solvents which are reactively inert to the alkoxyalkyl esters.

The following examples will serve to further illustrate the manner of practicing my invention.

*Example 1.—Butoxyethyl ester*

50 g. of bis (4-carboxyphenyl) sulfone, 100 g. of ethylene glycol monobutyl ether (mol ratio of approximately 1 to 5.2), and 2 g. of p-toluenesulfonic acid were refluxed under conditions that allowed the water formed by the esterification reaction to distill. The refluxing was continued until a clear solution was obtained which required 10–15 hours. The excess ethylene glycol monobutyl ether was removed by fractionation under a vacuum. The remaining residue was then washed with a dilute aqueous solution of sodium hydroxide and subsequently recrystallized from ethyl alcohol. A yield of 75–80% of the butoxyethyl ester of bis (4-carboxyphenyl) sulfone was obtained which had a melting point of 115°–116° C.

Example 2.—Ethoxyethyl ester 50 g. of ethylene glycol monoethyl ether, 20 g. of bis (4-carboxyphenyl) sulfone (mol ratio of approximately 1 to 8.5), and 2 g. of sulfuric acid were refluxed under the same conditions as in Example 1 and the product was separated and purified in the same manner. A yield of 65–70% of the ethoxyethyl ester of bis (4-carboxyphenyl) sulfone was obtained which had a melting point of 104° C.

Example 3.—Methoxyethyl ester

One mol proportion of bis (4-carboxyphenyl) sulfone was heated at 150°–170° C. with 2.4 mol proportions (20% excess) of PCl$_5$ to form the acid chloride of bis (4-carboxyphenyl) sulfone. The mixture was heated at 90°–110° C. in a vacuum to remove the HCl and POCl$_3$ which formed and the excess PCl$_5$. The crude acid chloride was then stirred with 6 mol proportions (200% excess) of ethylene glycol monomethyl ether until it had all dissolved. The reaction mixture was then heated in a vacuum at 70°–80° C. to remove the HCl which formed and the excess ethylene glycol monomethyl ether. The residue was then stirred with a dilute aqueous sodium hydroxide solution, filtered and washed. After recrystallizing from ethyl alcohol, a yield of 70–75% of the methoxyethyl ester of bis (4-carboxyphenyl) sulfone was obtained which had a melting point of 133° C.

Example 4.—Plasticized cellulose acetate containing the ethoxyethyl ester

A dope was prepared containing 6 g. of cellulose acetate (39% acetyl content), 2 g. of the ethoxyethyl ester of bis (4-carboxyphenyl) sulfone and 40 cc. of acetone. Films were prepared from this dope which were clear, tough and possessed a relatively high surface hardness.

Example 5.—Plasticized cellulose tripropionate containing the ethoxyethyl ester A dope was prepared containing 6 g. of cellulose tripropionate, 2 g. of the ethoxyethyl ester of bis (4-carboxyphenyl) sulfone and 40 cc. of acetone. Clear, tough films were made from this dope which were characterized by excellent surface hardness.

Example 6.—Plasticized cellulose acetate-butyrate containing the ethoxyethyl ester 100 parts by weight of cellulose acetate-butyrate and 25 parts by weight of the ethoxyethyl ester of bis (4-carboxyphenyl) sulfone were mixed on hot rolls and granulated. The granulated product was molded by injection molding methods to produce knobs, handles, etc., which had a high degree of surface hardness.

Example 7.—Plasticized vinyl chloride-vinyl acetate resin containing the ethoxyethyl ester A dope was made containing 10 g. of a vinyl resin consisting of 85% vinyl chloride and 15% vinyl acetate, 4 g. of the ethoxyethyl ester of bis (4-carboxyphenyl) sulfone and 60 cc. of acetone. Films cast from this dope were clear, tough and resistant to marring, scratching and surface deformation.

Other dopes and molding compositions can also be prepared using other alkoxyalkyl esters such as the butoxyethyl ester, the methoxyethyl ester, the ethoxypropyl ester, etc., and employing other resins such as the vinyl resins listed above. Thus, 20% by weight of the butoxyethyl ester can be incorporated on hot rolls into a cellulose propionate-butyrate resin and subsequently formed into injection-molded products possessing excellent surface characteristics. Similarly, other dopes can be prepared, for example, by preparing a solution in acetone of polystyrene containing 35% by weight of the resin of a mixture of the ethoxypropyl and the methoxyethyl esters of bis (4-carboxyphenyl) sulfone, from which sheets or films can be produced possessing excellent surface characteristics.

As pointed out at the beginning of this specification, all of the esters of bis (p-carboxyphenyl) sulfone mentioned hereinabove are diesters containing two alkoxyalkyl groups in each molecule. The "di" prefix has been omitted in most instances for brevity. This practice has also been followed in the terminology of the claims.

I claim:

1. Alkoxyalkyl esters of bis (4-carboxyphenyl) sulfones having the general formula:

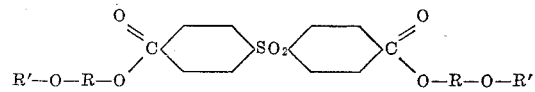

wherein R represents an alkylene radical containing from 2 to 4 carbon atoms and R' represents an alkyl radical containing from 1 to 6 carbon atoms.

2. The ethoxyethyl diester of bis (4-carboxyphenyl) sulfone.

3. The butoxyethyl diester of bis (4-carboxyphenyl) sulfone.

4. The methoxyethyl diester of bis (4-carboxyphenyl) sulfone.

5. A plastic composition comprising an alkoxyalkyl ester of bis (4-carboxyphenyl) sulfone having the general formula:

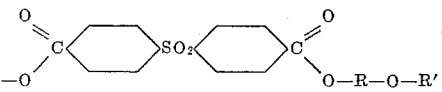

wherein R represents an alkylene radical containing from 2 to 4 carbon atoms and R' represents an alkyl radical containing from 1 to 6 carbon atoms incorporated into a lower alkanoic acid ester of cellulose.

6. A plastic composition comprising a lower alkanoic acid ester of cellulose plasticized with from 15 to 60 per cent by weight thereof of an alkoxyalkyl ester of bis (4-carboxyphenyl) sulfone having the general formula:

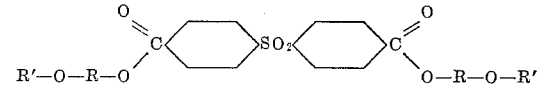

wherein R represents an alkylene radical containing from 2 to 4 carbon atoms and R' represents an alkyl radical containing from 1 to 6 carbon atoms.

7. A plastic composition as defined in claim 6 wherein the ester of cellulose is cellulose acetate.

8. A plastic composition as defined in claim 6 wherein the ester of cellulose is cellulose acetate-butyrate.

9. A plastic composition as defined in claim 6 wherein the ester of cellulose is cellulose propionate.

10. A plastic composition comprising a lower alkanoic acid ester of cellulose plasticized with from 15 to 60 per cent by weight thereof of the ethoxyethyl ester of bis (4-carboxyphenyl) sulfone.

11. A plastic composition comprising cellulose acetate plasticized with from 15 to 60 per cent by weight thereof of the ethoxyethyl ester of bis (4-carboxyphenyl) sulfone.

12. A plastic composition comprising cellulose acetate-butyrate plasticized with from 15 to 60 per cent by weight thereof of the ethoxyethyl ester of bis (4-carboxyphenyl) sulfone.

13. A plastic composition comprising cellulose propionate plasticized with from 15 to 60 per cent by weight thereof of the ethoxyethyl ester of bis (4-carboxyphenyl) sulfone.

JOHN R. CALDWELL.

References Cited in the file of this patent

UNITED STATES PATENTS

| Number | Name | Date |
| --- | --- | --- |
| 2,132,679 | Cox et al. | Oct. 11, 1938 |
| 2,198,583 | Grether et al. | Apr. 13, 1940 |
| 2,199,989 | Dickey | May 7, 1940 |
| 2,468,975 | Held et al. | May 3, 1949 |

OTHER REFERENCES

Meyer: "Ann. der Chem" (1923) 433, 338.